United States Patent [19]

Mizuno et al.

[11] Patent Number: 4,976,908
[45] Date of Patent: Dec. 11, 1990

[54] POLY(ARYLENE SULFIDE) SHEET PRODUCTION PROCESS

[75] Inventors: Toshiya Mizuno; Yoshikichi Teramoto; Takeshi Saito, all of Tsuchiura; Juichi Wakabayashi, Tamari, all of Japan

[73] Assignee: Kureha Kagaku Kogyo K. K., Japan

[21] Appl. No.: 291,201

[22] Filed: Dec. 28, 1988

[30] Foreign Application Priority Data

Dec. 28, 1987 [JP] Japan ................. 62-329542

[51] Int. Cl.$^5$ ............................................. B29C 47/88
[52] U.S. Cl. ............................. 264/210.2; 264/210.5; 264/235; 264/346
[58] Field of Search .................. 264/210.2, 210.5, 235, 264/235.6, 235.8, 342 R, 345, 346; 528/388

[56] References Cited

U.S. PATENT DOCUMENTS

| | | | |
|---|---|---|---|
| 3,637,592 | 1/1972 | Berr | 264/346 |
| 4,310,485 | 1/1982 | Dauber | 264/346 |
| 4,629,778 | 12/1986 | Sugie et al. | 264/331.11 |
| 4,645,826 | 2/1987 | Iizuka et al. | 528/388 |
| 4,731,390 | 3/1988 | Mizuno et al. | 264/210.7 |
| 4,769,190 | 9/1988 | Utsumi et al. | 264/235.8 |
| 4,774,298 | 9/1988 | Mizuno et al. | 264/331.11 |
| 4,777,228 | 10/1988 | Mizuno et al. | 264/331.11 |

FOREIGN PATENT DOCUMENTS

| | | | |
|---|---|---|---|
| 56-62128 | 5/1981 | Japan | 264/210.7 |
| 42611 | 10/1984 | Japan . | |
| 59-184619 | 10/1984 | Japan | 264/346 |
| 184619 | 10/1984 | Japan . | |
| 60-96439 | 5/1985 | Japan | 264/235.8 |
| 7332 | 1/1986 | Japan . | |

Primary Examiner—Jeffery Thurlow
Attorney, Agent, or Firm—Lowe, Price, LeBlanc, Becker & Shur

[57] ABSTRACT

A poly(arylene sulfide) sheet excellent in planarity and smoothness is formed of a composition composed at least principally of a substantially linear, high molecular poly(arylene sulfide) having a melt viscosity of at least 1,000 poises. It has an elongation at break of at least 10% at 23° C. and a Young's modulus of at least 5 kg/mm$^2$ at 200° C., and per area of 1 cm×2 cm on at least one of its surfaces, contains not more than 1 convexity or concavity whose angle of elevation or depression is at least 2° and whose height or depth is at least 10 μm. The sheet is produced by melting the composition, extruding the melt through a slit die, cooling and solidifying the extrudate into a sheet, preheating the sheet for 3–100 seconds in a temperature range of from a temperature 20° C. lower than the glass transition temperature of the polymer to a temperature 25° C. higher than the glass transition temperature, and then causing the thus-preheated sheet to pass between a heating roll heated at a temperature in a range of 120°–200° C. and a pinch roll under a pinch pressure of 0.05–10 kg/cm, whereby the sheet is continuously pressed under linear pressure, is subjected to a heat treatment for 3–100 seconds and is crystallized.

2 Claims, 2 Drawing Sheets

POLY(ARYLENE SULFIDE) SHEET PRODUCTION PROCESS

FIELD OF THE INVENTION

This invention relates to a sheet of a poly(arylene sulfide) which may hereinafter be called "PAS", and more specifically to an unstretched sheet composed at least principally of a poly(arylene sulfide) and having excellent planarity and smoothness and also to a production process thereof.

BACKGROUND OF THE INVENTION

Films composed principally of a PAS such as poly(phenylene sulfide) which may hereinafter be called "PPS" have excellent properties such as high heat and chemical resistance and are useful for various industrial applications. Their unstretched films cannot however avoid deformations such as heat shrinkage in a high temperature range. Unstretched PAS sheets of smaller orientation are hence used for applications where high-temperature dimensional stability is required. PAS has a lower glass transition temperature and its crystallization is indispensable in order to impart heat resistance to them. Among conventional unstretched PAS sheets, uncrystallized ones cannot however show sufficient strength when the temperature increases to 200° C. or so, while crystallized ones have a low elongation and are very brittle at that temperature.

Crystallization of an unstretched PAS film is effected by a heat treatment. Conventionally, a sheet-like (or film-like) formed product composed principally of a PAS such as PPS has heretofore been produced by melting the starting resin, extruding the melt through a slit die, cooling and solidifying the extrudate into a sheet, and then subjecting the sheet to a heat treatment. The heat treatment may be conducted after application of stretching if necessary. This conventional heat treatment is conducted by bringing a sheet, which is to be treated, into contact with a heated liquid or gas stream or a surface of a heated solid such as a roll (Japanese Patent Publication No. 42611/1984). It has also been known to smoothen the surfaces of a sheet-like material by subjecting the sheet-like material to a heat treatment while supporting it with clamps or the like at its periphery or causing it to continuously pass through a hot-air oven in a state supported at one or two points continuously or heat treating it on a smooth stainless steel belt, followed by compression forming or pressing between pressure rolls (Japanese Patent Laid-Open No. 184619/1984).

These conventional heat treatment methods are however difficult to provide sheets excellent in both planarity and smoothness when heat-treated sheets are industrially produced from PAS. Moreover, the provision of a smooth sheet requires a complex step such as compression forming or rolling, so that larger production facilities are required.

Incidentally, the behavior of a PAS sheet upon its heat treatment includes that a sheet cooled and solidified in an amorphous state is exposed to a temperature above the glass transition point owing to its heating and upon a lapse of a predetermined time, is crystallized and hardened. When a PAS sheet is subjected to a heat treatment in a heated liquid or gas stream by way of example, the sheet expands and becomes sticky as the temperature increases. When the temperature increases beyond the glass transition point of the PAS and the sheet becomes soft, the sheet is distorted or locally elongated, sticks to another material or object which is in contact with the sheet, or forms a roughened surface due to eruption of low boiling materials contained inside the PAS. Crystallization thereafter proceeds, thereby hardening the sheet. The resultant sheet is however poor in smoothness and its surface conditions are inferior. In the heat treatment method in which a PAS is simply brought into contact with a surface of a solid such as a heating roll or stainless steel belt, the sheet expands and moreover becomes sticky as the temperature increases. Accordingly, the sheet may locally and slightly float from the surface of the solid. Subsequent crystallization results in hardening of the sheet. In this case, height differences arise in the surface of the sheet between areas maintained in contact with the solid and those floated from the solid. It is hence only possible to obtain a sheet inferior in planarity and smoothness. When a PAS sheet is subjected to a heat treatment while holding it with clips or the like, the clipped parts become useless and moreover, the resultant sheet is susceptible to breakage from the clipped parts.

Even if such a crystallized sheet of poor planarity and smoothness is pressed by compression forming or rolling, it is impossible to fully remove the thickness irregularity, warpage, small ruggedness and the like to make the sheet excellent in planarity nd smoothness because it has already been crystallized. Moreover, the process is complex and disadvantageous economically.

OBJECTS AND SUMMARY OF THE INVENTION

An object of this invention is to overcome the above-mentioned drawbacks of the conventional heat treatment methods and hence to provide a PAS sheet excellent in planarity and smoothness.

Another object of this invention is to provide a PAS sheet excellent in planarity and smoothness, high in elongation and good in dimensional stability through a simple heat treatment step.

As a result of an extensive investigation, the present inventors have found that a PAS sheet excellent in planarity and smoothness can be obtained without need for an application of stretching by melting a composition composed at least principally of a substantially linear, high molecular PAS, extruding the melt through a slit die, cooling and solidifying the extrudate into a sheet, preheating the sheet, and then causing the thus-preheated sheet to pass between a heating roll and a pinch roll to press the sheet continuously under linear pressure, thereby to heat-treat the sheet to crystallize same. The present invention has been completed on the basis of this finding.

Therefore, according to this invention, it is possible to provide a PAS sheet having high tensile strength at break, elongation at break and Young's modulus and also excellent planarity and smoothness such that per area of 1 cm x 2 cm on a surface of the sheet, the sheet contains not more than convexity or concavity whose angle of elevation or depression is at least 2° and whose height or depth is at least 10 μm.

Namely, in one aspect of this invention, there is provided a poly(arylene sulfide) sheet excellent in planarity and smoothness. The sheet is formed of a composition composed at least principally of a substantially linear, high molecular poly(arylene sulfide) having a melt viscosity of at least 1,000 poises. The sheet has an elongation at break of at 5 kg/mm² at 200° C., and per area of 1 cm×2 cm on at least one of the surfaces of the sheet, the sheet contains not more than 1 convexity or concavity whose angle of elevation or depression is at least 2° and whose height or depth is at least 10 μm.

In another aspect of this invention, there is also provided a process for the production of a poly(arylene sulfide) film excellent in planarity and smoothness. The process comprises melting a composition composed at least principally of a substantially linear, high molecular poly(arylene sulfide) having a melt viscosity of at least 1,000 poises, extruding the melt through a slit die, cooling and solidifying the extrudate into a sheet, preheating the sheet for 3-100 seconds in a temperature range of from a temperature 20° C. lower than the glass transition temperature of the polymer to a temperature 25° C. higher than the glass transition temperature of the polymer, and causing the thus-preheated sheet to pass between a heating roll heated at a temperature in a range of 120°-200° C. and a pinch roll under a pinch pressure of 0.05-10 kg/cm, whereby the sheet is continuously pressed under linear pressure, is subjected to a heat treatment for 3-100 seconds and is crystallized.

In the above production process, physical properties of the sheet, such as its dimensional stability at high temperatures, can be improved further by subjecting the sheet to an additional heat treatment at an elevated temperature of 200°-280° C. for 0.1-180 minutes.

BRIEF DESCRIPTION OF THE DRAWINGS

FIG. 1 shows surface conditions of a surface of a sheet obtained in Example 3, which was on the side brought into contact with a ceramic roll;

FIG. 2 depicts surface conditions of the other surface of the sheet obtained in Example 3, which was on the side brought into contact with a rubber roll; and FIG. 3 illustrates surface conditions of a surface of a sheet obtained in Comparative Example 4, which was on the side brought into contact with a ferro plate.

Figure 1:
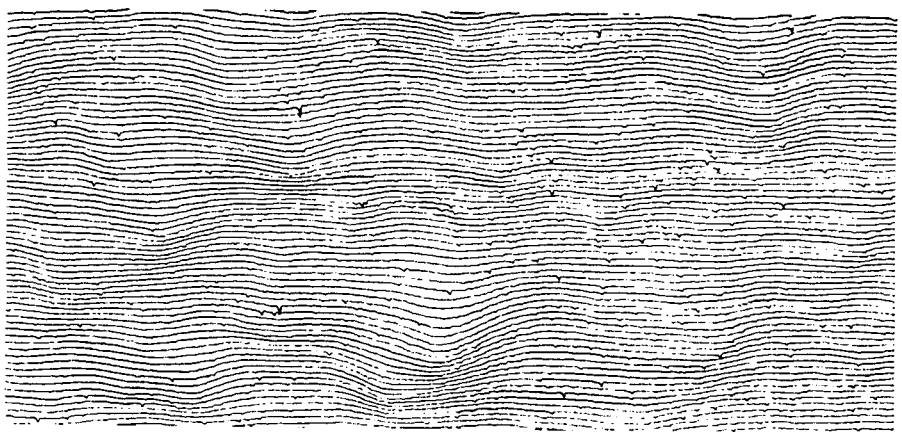
FIGS. 1 through 3 illustrate the three-dimensional roughness of a PAS sheet according to this invention and that of a sheet of a Comparative Example.

Here, in each drawing, the horizontal direction corresponds to the machine direction of the corresponding sheet (magnification: ×10) while the vertical direction corresponds to the transverse direction of the same sheet (magnification: ×10). On the other hand, the direction vertical to the plane of the sheet indicates the direction of height or depth of each concave or convex in the surface of the sheet (magnification: ×500). These three-dimensional roughness diagrams were obtained by scanning the respective sheets in the machine direction by a three-dimensional roughness meter.

DETAILED DESCRIPTION OF THE INVENTION

Essential elements of the present invention will hereinafter be described in detail. (PAS)

The PAS useful in the practice of this invention is a substantially linear poly(arylene sulfide) having a melt viscosity of at least 1,000 poises but at most 50,000 poises.

Such a PAS can be obtained, for example, by the process described in Japanese Patent Laid-Open No. 7332/1986.

In order to permit formation into a sheet, the PAS employed in this invention should be a substantially linear, high molecular PAS whose melt viscosity is at least 1,000 poises, preferably, 2,500-30,000 poises at 310° C. and at a shear rate of 200 sec⁻¹. as measured at 310° C. and at a shear rate of 200 sec⁻¹. The term "substantially linear, high molecular PAS" as used herein does not mean such a polymer as obtained through curing by oxidative crosslinking but does mean a polymer obtained from a monomer composed principally of a substantially bifunctional monomer.

If the melt viscosity of the PAS is lower than 1,000 poises, the PAS is inferior in film-forming property and is unable to provide a sheet stably.

Such a substantially linear, high molecular PAS can be obtained suitably by subjecting an alkali metal sulfide and a dihalogenated aromatic compound to specific two-stage heat-up polymerization in the presence of water in an organic amide solvent such as N-methylpyrrolidone as disclosed in Japanese Patent Laid-Open No. 7332/1986 referred to above.

Illustrative examples of the alkali metal sulfide may include lithium sulfide, sodium sulfide, potassium sulfide, rubidium sulfide, cesium sulfide, and mixtures thereof.

As exemplary dihalogenated aromatic compounds, may be mentioned p-dichlorobenzene, m-dichlorobenzene, 2,5-dichlorotoluene, p-dibromobenzene, 2,6-dichloronaphthalene, 1-methoxy-2,5-dichlorobenzene, 4,4'-dichlorobiphenyl, 3,5-dichlorobenzoic acid, p,p'-dichlorodiphenyl ether, 4,4'-dichlorodiphenyl sulfone, 4,4'-dichlrodiphenyl sulfoxide, 4,4'-dichlorodiphenyl ketone, and mixtures thereof.

PAS useful in the practice of this invention are substantially linear. Of these, poly(p-phenylene sulfide) (PPS) and poly(p-phenylene sulfide) copolymers containing m-phenylene sulfide units as a minor component are preferred.

The term "poly(arylene sulfide) (PAS)" will hereinafter means a substantially linear, high molecular PAS at every occurrence unless otherwise specifically indicated. (Optional components)

Although a PAS alone may be used, it is also feasible to add a small amount of a polyolefin such as polyethylene, polypropylene or poly-4-methyl-pentene-1, a rubber such as polyisoprene, or a thermoplastic resin such as polyethylene terephthalate, polycarbonate, tetrafluorinated ethylene resin, polyether ether ketone or poly(ketone sulfide).

It is also feasible to incorporate one or more of various organic and inorganic fillers such as glass fibers, carbon black, talc, clay, titanium oxide, molybdenum disulfide and carbon fibers.

Besides, additives such as antioxidant, heat stabilizer and lubricant may also be incorporated.

These optional components may be mixed by a conventional mixing method, or may be mixed in a molten state and pelletized and thereafter fed to a melt extruder. (Linearly-pressurized heat treatment method)

Upon formation of a PAS sheet, a PAS or a composition composed principally of the PAS is generally fed to a melt extruder and then heated to a temperature of the melting point of the PAS or higher, so that the polymer or composition is molten. The thus-molten PAS is continuously extruded in the form of a sheet through a slit die such as a T-die, followed by its quenching to a temperature of the glass transition temperature of the PAS or lower so that the sheet is cooled and solidified. The sheet cooled and solidified in an amorphous state is then subjected to a heat treatment step.

The characteristic feature of this invention resides in the heat treatment step. The heat treatment method in this invention may be called a "linearly-pressurized heat treatment method" or "linearly-pressurized crystallization method".

Namely, in the heat treatment method of this invention, a sheet cooled and crystallized in an amorphous state is first of all preheated to make it soft. The sheet is thereafter caused to pass between a heating roll and pinch roll so that the sheet is continuously and linearly pressed to conduct its heat treatment and hence crystallization.

In the conventional heat treatment method, a sheet (or film) was immediately brought into contact, for example, with a heating roll to perform its heat treatment so that preheating was not applied (Japanese Patent Publication No. 42611/1984). In this invention, this preheating treatment is however an essential step for obtaining a sheet with planarity and smoothness. The preheating temperature ranges from a temperature 20° C. lower than the glass transition temperature of the PAS to a temperature 25° C. higher than the glass transition temperature. Here, the term "glass transition temperature" means a value corresponding to the point of inflection toward the endothermic side when measured at a heating rate of 10° C. per minute by a differential scanning calorimeter (DSC). If the preheating temperature is lower than the lower limit of the above range, desired planarity and smoothness cannot be obtained. If it is higher than the upper limit of the above range on the other hand, the temperature overlaps with the crystallization temperature of the PAS. Again, the purpose cannot not be attained. The preheating time may range from 3 seconds to 100 seconds. If it is shorter than 3 seconds, the effects of the preheating that both planarity and smoothness are imparted cannot be brought about fully. In contrast, any preheating time longer than 100 seconds results in localized crystallization at the time of the preheating. Outside the above range, it is hence difficult to achieve the purpose of the preheating.

Preheating can be conducted by bringing a sheet into contact with hot air or heating roll. As a preferable heating means, it may be mentioned to perform preheating by heat pinch rolls, which will be described subsequently, within the above temperature range and then causing a sheet to pass between the pinch rolls so as to have the sheet travel along and in contact with the surfaces of the pinch rolls for a predetermined period of time before the sheet is caused to pass between a heating roll and a pinch roll.

The heat treatment of this invention is conducted using a heating roll. A heat treatment apparatus is constructed of this heating roll and a pinch roll. The pinch roll is maintained in linear contact under a predetermined pressure (pinch pressure) with the surface of the heating roll. Adjustment of the pinch pressure is generally effected by controlling an air cylinder attached to the pinch roll and hence controlling the contact pressure between the pinch roll and heating roll. Further, by reading the indication of an accessory pressure gauge, the pinch pressure (linear pressure) can be calculated from the diameter of the air cylinder and the length of the roll surface and/or regulated.

The pinch roll may be either a metal roll or a rubber roll. The rubber roll is however preferred for the suitable control of the pinch pressure. In addition, the pinch roll must not give any damages to the matching heating roll and must be able to apply a uniform pressure along the length thereof.

A heat treatment of an amorphous PAS sheet is conducted by causing the sheet to pass continuously between the heating roll and pinch roll and hence pressing the sheet therebetween. The pressing of the sheet is effected continuously under linear pressure between both the rolls.

The pinch pressure (linear pressure) may be 0.05–10 kg/cm, preferably, 0.1–5 kg/cm. If the pinch pressure is too low, it is difficult to impart planarity and smoothness to a sheet. On the other hand, any unduly high pinch pressure results in excess stretching and orientation so that the dimensional stability at high temperatures is deteriorated and the planarity and smoothness are also deteriorated. Pinch pressures outside the above range are therefore not preferred.

The temperature of the heating roll may be controlled between 120° C. and 200° C. with a range of 140°–160° C. being preferred. Any temperatures lower than 120° C. lead to unduly slow crystallization and are therefore inefficient. Any temperatures higher than 200° C. however cause a sheet to undergo unduly large thermal expansion thereby making it difficult to obtain a sheet having good planarity and smoothness. The heating roll may be either a metal roll or a ceramic roll. For PAS sheets, a ceramic roll can be used preferably because it has low stickiness to the sheets.

Since the pinch roll maintained in contact with the heating roll is heated to about 80°–110° C. substantially equal to the glass transition temperature of the PAS owing to conduction of heat from the heating roll, an amorphous PAS sheet can be preheated by causing the sheet to travel along and in contact with the surface of the pinch roll.

When the crystallized PAS sheet obtained in the manner described above is subjected to an additional heat treatment at an elevated temperature of 200°–280° C. for 0.1–180 minutes, a sheet having not only excellent planarity and smoothness but also a still higher modulus of elasticity can be obtained. This sheet is superb in dimensional stability. Below the lower limit of the above temperature range, the degree of crystallization may remain somewhat low and the modulus of elasticity may not be increased substantially. In contrast, above the upper limit of the above temperature range, fusion takes place and the planarity and smoothness are deteriorated. Further, any heating time shorter than the lower limit of the above range cannot give the effects of the heating fully. On the other hand, any unduly long heating time is not economical from the process consideration. (Heat-treated PAS sheet)

The PAS sheet according to this invention is an unstretched and unoriented sheet, and is a thin film-like formed product whose thickness is generally 5 mm or smaller with 10 $\mu$m–2 mm being preferred.

The PAS sheet of this invention is markedly superior in planarity and smoothness to conventional PAS sheets.

Described in regard to planarity, a PAS sheet obtained, for example, by a conventional heat treatment method featuring simple contact to a solid surface such as a heating roll contains different spots corresponding respectively to areas contacted or stuck to the solid and those floated from the solid and further, on the side not brought into contact with the solid, a granular surface structure is formed due to eruption of low boiling materials or lip streaks are observed all over that surface. In contrast, the PAS sheet according to this invention is free of such a granular surface structure at both surfaces thereof, contains no distortion, warpage or lip streaks over the entire surfaces thereof, and has good planarity and smoothness.

Regarding smoothness, the PAS sheet of this invention has suitable surface roughness and small coefficient of dynamic friction and has excellent utility.

With respect to surface roughness, PAS sheets obtained by the conventional heat treatment method include some sheets which show a good value when measured locally. When however observed over a wide area, many minute concavities and convexities of at least a certain size are observed. When concavities and convexities having an elevation or depression angle of at least 2° and a height or depth of at least 10 μm are observed in a surface area of 1 cm×2 cm of each sheet by a surface roughness meter ("SURFCOM 550A", trade name; manufactured by Tokyo Seimitsu Co., Ltd.), sheets by the conventional heat treatment method contain many concavities and convexities whereas the PAS sheet of this invention contains only 0–1 concave or convex.

Better results have also been observed in connection with mechanical properties. The PAS sheet of this invention has good mechanical properties as demonstrated by its elongation at break of at least 10% at 23° C. and its Young's modulus of at least 5 kg/mm² at 20° C. Even when the sheet is bent for its processing or is set under tension or is subjected to drawing as in vacuum forming or pressure forming, the sheet is resistant to breakage and can be used with ease.

PAS sheets according to this invention can be used in a wide variety of application fields in which heat resistance, planarity, smoothness and the like are required, for example, in the field of electronic and electrical engineering as capacitor films, flexible printed circuit boards, base films for magnetic films, chip carriers and TAB (tapes for automated bonding) and in the field of mechanical engineering as sliding members like bushings which are each formed of an iron plate and a filler-added film bonded to the iron plate.

ADVANTAGES OF THE INVENTION

The process of this invention has made it possible to obtain a PAS sheet excellent in planarity and smoothness by melting a composition composed at least principally of a substantially linear, high molecular PAS, extruding the melt through a slit die, cooling and solidifying the extrudate into a sheet, preheating the sheet, and then causing the thus-preheated sheet to pass between a heating roll and a pinch roll, whereby the sheet is continuously pressed under linear pressure, is subjected to a heat treatment and is crystallized.

PAS sheets according to this invention are extremely superior in planarity and smoothness to conventional PAS sheets and moreover have good dimensional stability at high temperatures. They can therefore be used in a wide variety of fields, typified by the field of electronic and electrical engineering and the field of mechanical engineering.

EMBODIMENTS OF THE INVENTION

The present invention will hereinafter be described specifically by the following Examples and Comparative Examples. It should however be borne in mind that this invention is not limited to the following Examples only. By the way, all designations of "part" or "parts" and "%" will mean part or parts by weight and wt. % unless otherwise specifically indicated.

The following methods were followed for the measurement of characteristic data of PAS and sheets in this invention.

Melt viscosity

The melt viscosity of each PAS was measured at 310° C. and a shear rate of 200 sec$^{-1}$.

Surface roughness

Each surface roughness Ra (μm) was measured in accordance with JIS B-0601, using the surface roughness meter ("SURFCOM 550A", trade name; manufactured by Tokyo Seimitsu Co., Ltd.).

Coefficient of dynamic friction

Each coefficient of dynamic friction was measured in accordance with ASTM D-1894, using a "Friction Meter, Model TR" manufactured by Toyo Seiki Seisakusho, Ltd.

Degree of crystallization

A density gradient tube was formed using a zinc chloride-water system. From specific gravity ($\rho$) measured at 23° C., crystalline density ($\rho c$) and amorphous density ($\rho a$), the weight-average degree of crystallization (Xc) was determined in accordance with the following equation.

$$X_c = (\rho c/\rho)\{(\rho - \rho a)/(\rho c - a)\}$$

Incidentally, $\rho c$ and $\rho a$ of the poly(phenylene sulfide) used in the present Examples were 1.43 and 1.32 respectively.

Tensile strength at break, elongation at break, Young's modulus

Using "TENSILON" (trade mark) manufactured by Toyo-Baldwin Company, sample sheets punched out by a No. 5 dumbbell were measured at 23° C. and 200° C. respectively in accordance with ASTM D-638. The sample length, width and stretching rate were set at 33 mm, 6 mm and 50 mm/min respectively. The tensile strength at break and elongation at break were determined from a strain-stress curve, while the Young's modulus was determined from the initial strain zone.

Planarity and smoothness

Evaluation of the planarity and smoothness of each PAS sheet was conducted by the evaluation of its smoothness, which relied upon its surface roughness and its coefficient of dynamic friction. Moreover, as evaluation which takes the planarity into account, concavities and convexities having a depression or elevation angle of at least 2° and a depth of height of at least 10 μm were counted by the surface roughness meter. Their numbers were also adopted as a standard for the evaluation in this invention. Described specifically, the three-dimensional roughness of each PAS sheet according to this invention was diagrammatically shown by an instrument which was composed of the above-described surface roughness meter and a three-dimensional roughness measuring plotter. From the three-dimensional diagram obtained by the instrument, the shapes and numbers of concavities and convexities in a surface area of 1 cm×2 cm of the sheet were determined.

Example 1:

Pellets of poly(phenyl sulfide) produced by Kureha Chemical Industry Co., Ltd., those melt viscosity was 4,100 poises at 310° C. and 200 sec$^{-1}$, were extruded into a sheet-like form through a T-die which was fitted to an extruder having a barrel diameter of 35 mm and an L/D ratio of 28 and defined a lip having a clearance of 0.55 mm and a width of 250 mm. The melt temperature of the polymer was 310° C., and the delivery rate was 3.5 kg/hour. The thus-extruded sheet was quenched on a metal roll which had a diameter of 300 mm and was controlled at 85° C., and was then wound into a roll. Here, the distance between the die lip and the metal roll was about 10 mm. The winding speed was controlled so that the sheet thus wound had a thickness of 400 μm. The winding speed was about 0.6 m/min at that time. The sheet had a density of 1.32 and was amorphous.

A heat treatment apparatus constructed of a ceramic roll having a diameter of 150 mm and a surface roughness of 0.063 μm, a rubber-made pinch roll, etc. was provided. The gauge pressure was controlled at 3.0 kg/cm$^2$ so that the pinch pressure of the line pressure was 1.2 kg/cm. Moreover, the temperature of the ceramic roll was controlled at 155° C. On the other hand, the surface temperature of the rubber roll was about 100° C. After the above-mentioned wound amorphous sheet was fed along and in contact with the surface of the rubber roll to preheat it for 10 seconds, the sheet was introduced into the pinching point. After passing through the pinching point, the sheet was transferred onto the ceramic roll on which the sheet was subjected to a heat treatment and was hence crystallized. The residence time of the sheet on the ceramic roll was about 30 seconds. On the other hand, the peripheral speed of the surface of the ceramic roll was about 0.3 m/min. Under those conditions, the sheet was wound up to about 25 m on a take-up roll. This sheet will be designated as the "heat-treated sheet (A)". Physical properties of the sheet (A) were measured. Results are given in Table 1.

EXAMPLE 2:

The heat-treated sheet (A), still wound on the roll, was subjected to an additional heat treatment for about 10 minutes in a Geer oven which was controlled at 260° C. The resultant heat-treated sheet will be designated as the "heat-treated sheet (B)".

Evaluation results of physical properties of the sheet (B) are also given in Table 1.

COMPARATIVE EXAMPLES 1-2:

For the sake of comparison, physical properties of a heat-untreated amorphous sheet (Comparative Example 1) of Example 1 and a sheet (Comparative Example 2; hereinafter called the "heat-treated sheet H-1") obtained by subjecting the amorphous sheet to a heat treatment for 10 minutes on a ferro plate, which was a metal plate having a mirror-finished chromium-plated surface, in a Geer oven of 260° C. are also given in Table 1.

As will be apparent from Table 1, the heat-treated sheets of this invention were excellent in both planarity and smoothness and were also high in elongation at break and Young's modulus and good in mechanical strength. The sheet of Example 2, which was subjected to the additional heat treatment at the elevated temperature, was improved further in Young's modulus. In contrast, the untreated sheet and heat-treated sheet (H-1) of the Comparative Examples had smaller surface roughness locally but when observed over a wide area, had lip streaks, spots and/or a granular surface structure, whereby their planarity and smoothness were inferior. In particular, the heat-treated sheet of Comparative Example 2 contained concavities and convexities, which had an angle of elevation or depression of at least 2° and a depth or height of at least 10 μm, as many as 20 in total per surface area of 1 cm×2 cm of the sheet, whereby it was inferior in planarity and smoothness. Incidentally, the untreated sheet of Comparative Example 1 was inferior in both heat resistance and mechanical strength.

TABLE 1

| | | Smoothness Surface roughness (Ra, μm), coefficient of dynamic friction in brackets | | | Degree of crystallization (wt. %) | Tensile strength at break (kg/mm$^2$) | |
|---|---|---|---|---|---|---|---|
| | | Ceramic roll side | Punch roll side | Planarity | | 23° C. | 200° C. |
| Ex. 1 | Heat-treated sheet (A) | 0.153 [0.4] | 0.166 [0.4] | Extremely good on both sides* | 20 | 5.2 | 5.0 |
| Ex. 2 | Heat-treated sheet (B) | 0.156 [0.4] | 0.175 [0.4] | Extremely good on both sides* | 29 | 6.2 | 4.5 |
| Comp. Ex. 1 | Untreated sheet | 0.008 [≧1] | | Good, but contained lip streaks | 0 | 4.6 | 0 |
| | | Ferro plate side | Air side | Ferro plate side / Air side | | | |
| Comp. Ex. 2 | Heat treated sheet (H-1) | 1.30 [0.4] | 1.80 [0.4] | Formation of spots corresponding to areas kept in contact with ferro plate and those afloat / Formation of granular surface structure probably as trace of eruption of low boiling materials. | 22 | 9.0 | 4.0 |

TABLE 1-continued from ferro plate.

| | | Elongation at break (%) | | Young's modulus (kg/mm$^2$) | | Number of concavities and convexities having a height or depth of at least |
|---|---|---|---|---|---|---|
| | | 23° C. | 200° C. | 23° C. | 200° C. | 10 μm per 1 cm × 2 cm area of sheet surface |
| Ex. 1 | Heat-treated sheet (A) | 90 | 340 | 350 | 25 | 0 |
| Ex. 2 | Heat-treated sheet (B) | 30 | 300 | 380 | 35 | 0 |
| Comp. Ex. 1 | Untreated sheet | 220 | 0 | 290 | 0 | 0 |
| Comp. Ex. 2 | Heat-treated sheet (H-1) | 5 | 290 | 350 | 30 | 20 |

*Planarity: "Extremely good" indicates planarity of such a degree that when judged visually, the sheet was extremely smooth and no irregularity was observed, neither distortion nor warpage or the like was contained over the entire surfaces of the sheet, and the sheet was hence flat.

EXAMPLE 3:

Using the poly(phenylene sulfide) produced by Kureha Chemical Industry Co., Ltd. and having a melt viscosity of 8,200 poises at 310° C. and 200 sec$^{-1}$ and a similar T-die as in Example 1, a substantially-unoriented amorphous sheet having a thickness of 47 μm was obtained by controlling the delivery rate and winding speed. The resultant sheet was subjected to a linearly-pressurized heat treatment under substantially the same conditions as in Example 1. Evaluation results of physical properties of the heat-treated sheet are given in Table 2.

EXAMPLE 4:

The heat-treated sheet obtained in Example 3 was subjected to an additional heat treatment for about 10 minutes in a Geer oven of 260° C. Evaluation results of physical properties of the resulting sheet are given in Table 2.

COMPARATIVE EXAMPLES 3-4:

The substantially-unoriented amorphous sheet, which was subjected to extrusion-casting in Example 3 and had a thickness of 47 μm, is used as a sheet of Comparative Example 3. In addition, this amorphous sheet was placed on a ferro plate and was then heat-treated for 10 minutes in a Geer oven of 260° C. The resultant sheet will be designated as the heat-treated sheet (H-2) of Comparative Example 4. Evaluation results of physical properties of those films are given in Table 2.

As will be apparent from Table 2, the heat-treated sheets of this invention were excellent in both planarity and smoothness and were also good in mechanical strength. The sheet of Example 4, which was subjected to the additional heat treatment at the elevated temperature, was improved further in tensile strength at break and Young's modulus and had a sufficiently high modulus of elasticity.

In contrast, the sheets of the Comparative Examples were inferior in planarity and smoothness. In particular, the heat-treated sheet of the Comparative Example 4 contained concavities and convexities, which had an angle of elevation or depression of at least 2° and a depth or height of at least 10 μm, as many as 35 in total per surface area of 1 cm × 2 cm of the sheet, whereby it was inferior in planarity and smoothness even when judged visually. The untreated sheet was not suited for use at elevated temperatures.

TABLE 2

| | | Smoothness Surface roughness (Ra, μm) | | Planarity | Degree of crystallization (wt. %) | Tensile strength at break (kg/mm$^2$) | |
|---|---|---|---|---|---|---|---|
| | | | | | | 23° C. | 200° C. |
| | | Ceramic roll side | Pinch roll side | | | | |
| Ex. 3 | Heat-treated sheet | 0.743 | 0.644 | Extremely good on both side, but matted on the side of pinch roll | 23 | 6.4 | 5.5 |
| Ex. 4 | Heat-treated sheet | 0.160 | 0.641 | Extremely good on both side, but matted on the side of pinch roll | 30 | 8.0 | 7.0 |
| Comp. Ex. 1 | Untreated sheet | 0.006 | | Good, but contained some lip streaks | 0 | 5.0 | 0 |
| | | Ferro plate side | Air side | Ferro plate side / Air side | | | |
| Comp. | Heat | 1.50 | 1.80 | Marked Formation | 21 | 7.5 | 5.3 |

TABLE 2-continued

| | | | | formation of spots corresponding to areas kept in contact with ferro plate and those afloat from ferro plate. Sheet was highly twisted. | of granular surface structure. Sheet was highly twisted. |
|---|---|---|---|---|---|
| Ex. 4 | treated sheet (H-2) | | | | |

| | | Elongation at break (%) | | Young's modulus (kg/mm$^2$) | | Number of concavities and convexities having a height or depth of at least |
|---|---|---|---|---|---|---|
| | | 23° C. | 200° C. | 23° C. | 200° C. | 10 μm per 1 cm × 2 cm area of sheet surface |
| Ex. 3 | Heat-treated sheet | 32 | 320 | 381 | 30 | 0 |
| Ex. 4 | Heat-treated sheet | 11 | 300 | 408 | 38 | 0 |
| Comp. Ex. 1 | Untreated sheet | 270 | 0 | 270 | 0 | 0 |
| Comp. Ex. 4 | Heat-treated sheet (H-2) | 26 | 315 | 338 | 34 | 35 |

EXAMPLE 5:

Pellets were obtained by adding 0.3 part of calcium carbonate and 0.2 parts of calcium stearate, both of which had an average particle size of 0.7 μm, to the poly(phenylene sulfide) produced by Kureha Chemical Industry Co., Ltd. and having a melt viscosity of 5,900 poises at 310° C. and 200 sec$^{-1}$. The pellets were melt-extruded into a sheet-like form through a T-die in the same manner as in Example 1, whereby a substantially-unoriented, amorphous sheet having a thickness of 64 μm was obtained.

In a similar manner as in Example 1, the sheet was preheated and then pressed linearly to conduct its heat treatment. The planarity of the heat-treated sheet thus obtained was extremely good. Its surface roughness (Ra), which was an indication of smoothness, was 0.160 μm on the side of the ceramic roll and 0.510 μm on the side of the rubber roll. The surface on the side of the ceramic roll was glossy, while the surface on the side of the rubber roll was somewhat matted. The degree of crystallization of the sheet was 22 wt. %, its tensile strength at break was 6.3 kg/mm$^2$ at room temperature (23° C.) and 5.1 kg/mm$^2$ at 200° C. respectively, its elongation at break was 25% at room temperature and 340% at 200° C. respectively, and its Young's modulus was 308 kg/mm$^2$ at room temperature and 32 kg/mm$^2$ at 200° C.

COMPARATIVE EXAMPLE 5:

The substantially-oriented, amorphous sheet of 400 μm thick produced in Example 1 was sandwiched between two ferro plates whose inner surfaces had been sprayed with a polyfluoroethylene parting agent, and was then subjected to a pressurized heat treatment for 10 minutes under a pressing force of 10 kg/cm$^2$ on a press controlled at 260° C. The sheet thus heat-treated was taken out and cooled. Melt-adhesion or the like was not observed between the ferro plates and PPS sheet.

The resultant heat-treated sheet contained, in the pattern of spots, areas crystallized in intimate contact with the ferro plates and those crystallized afloat from the ferro plates and was poor in planarity. The degree of crystallization of the heat-treated sheet was 24 wt. %.

Per area of 1 cm×2 cm of sheet surface, the total number of concavities and convexities having an angle of elevation or depression of at least 2° and a height or depth of at least 10 μm was 0 in Example 5 but was 8 in Comparative Example 5. The sheet of Comparative Example 5 was therefore inferior in planarity.

EXAMPLE 6:

Using the same PPS as that employed in Example 3, which had a melt viscosity of 8,200 poises, and a T-die similar to that used in Example 1, a substantially-unoriented, amorphous sheet having a different thickness was produced by changing the delivery rate of the polymer and the winding speed.

The amorphous sheet thus obtained was preheated and then subjected to a linearly-pressurized heat treatment under similar conditions as in Example 1.

Evaluation results of physical properties of the heat-treated sheet are given in Table 7.

EXAMPLE 7:

The heat-treated sheet obtained in Example 6 was subjected to an additional heat treatment for about 10 minutes in a Geer oven of 260° C.

Evaluation results of physical properties of the resulting sheet are given in Table 3.

TABLE 3

| Ex. | Thickness of sheet (μm) | Elongation at break at 23° C. (%) | Young's modulus at 200° C. (kg/mm$^2$) | Number of concavities and convexities having a height or depth of at least 10 μm per 1 cm × 2 cm area of sheet surface |
| --- | --- | --- | --- | --- |
| 6 | 722 | 114 | 23 | 0 |
| 7 | 694 | 36 | 38 | 0 |

EXAMPLES 8-12:

Using the PPS having a melt viscosity was 8,200 poises which was the same PPS as that employed in Example 3, a substantially-unoriented amorphous sheet of 400 μm thick was obtained in substantially the same manner as in Example 1. The sheet was thereafter heat-treated in exactly the same manner as in Example 1, and the resultant heat-treated sheet was subjected to a heat treatment for varied time periods in a Geer oven controlled at 260° C., thereby producing heat-treated sheets.

Evaluation results of the sheets thus obtained are given in Table 4.

From Table 4, it is indicated that the elongation at break increases up to a certain period of time by heat treatment but when heat-treated for a long period of time, the high-temperature Young's modulus increases but the elongation at break decreases slightly as the degree of crystallization increases. It is hence envisaged from these results that heat treatment conditions can be chosen suitably depending on physical properties required for each application.

TABLE 4

| Ex. | Heat treatment time (min) | Elongation at break at 23° C. (%) | Young's modulus at 200° C. (kg/mm$^2$) | Number of concavities and convexities having a height or depth of at least 10 μm per 1 cm × 2 cm area of sheet surface |
| --- | --- | --- | --- | --- |
| 8 | 10 | 40 | 36 | 0 |
| 9 | 20 | 67 | 38 | 0 |
| 10 | 30 | 75 | 38 | 0 |
| 11 | 60 | 38 | 40 | 0 |
| 12 | 120 | 33 | 45 | 0 |

COMPARATIVE EXAMPLE 6:

The pinch rolls were removed from the linearly-pressurized heat treatment apparatus used in Example 1.

The temperature of the heating roll was controlled at 155° C. The amorphous sheet produced in Example 1 was continuously allowed to run on the heating roll by way of a guide roll which was not in contact with the heating roll, and was then taken up. The residence time of the sheet on the heating roll was about 30 seconds.

The resultant sheet had significant distortion and waving and its planarity was extremely bad. Further, many spots corresponding to areas maintained in intimate contact with the roll and those afloat therefrom were observed on a surface. A granular surface structure, which was believed to be traces of eruption of low boiling materials, was observed in the other surface.

Figure 2:
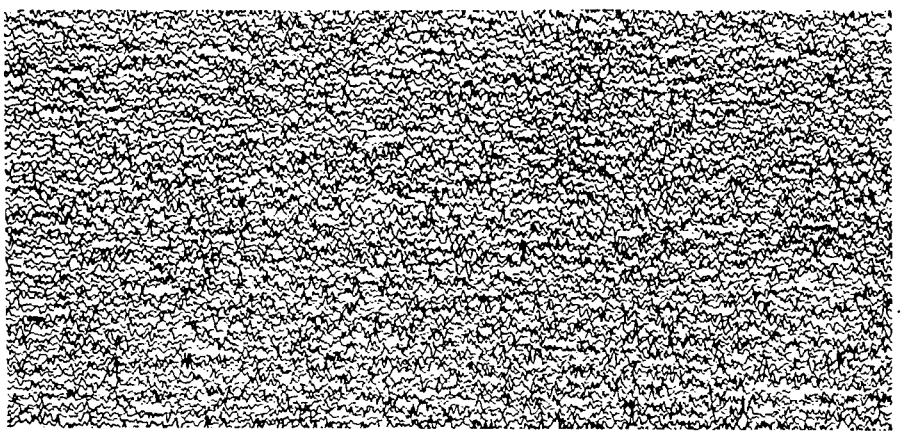
Figure 3:
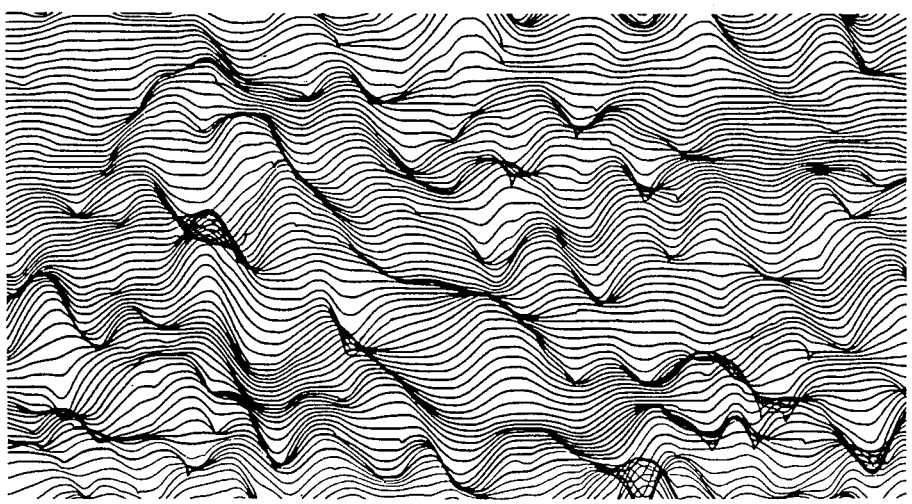

MEASUREMENT OF THREE-DIMENSIONAL ROUGHNESS:

Using the instrument which was equipped with the surface roughness meter and three-dimensional roughness measuring plotter, three-dimensional diagrams of the surfaces of the respective sheets were obtained as described above. Examples are shown in FIGS. 1 through 3. FIG. 1 shows conditions of the surface of the sheet obtained in Example 3, which was on the side brought into contact with the ceramic roll, FIG. 2 depicts surface conditions of the other surface which was on the side brought into contact with the rubber roll, and FIG. 3 illustrates conditions of the surface of the sheet obtained in Comparative Example 4, which was on the side brought into contact with the ferro plate. Here, in each drawing, the horizontal direction corresponds to the machine direction of the corresponding sheet (magnification: ×10) while the vertical direction corresponds to the direction vertical to the machine (magnification: ×10). On the other hand, the direction vertical to the plane of the sheet indicates the direction of height or depth of each concave or convex in the surface of the sheet (magnification: ×500). These three-dimensional roughness diagrams were obtained by scanning the respective sheets in the machine direction by a three-dimensional roughness meter.

As will be envisaged from these drawings, the sheets of this invention are superior in planarity but those of the Comparative Examples contained many and large surfaces concavities and convexities at their surfaces.

From each three-dimensional diagram obtained by the instrument, the shape and number of concavities and/or convexities per surface area of 1 cm × 2 cm of the corresponding sheet were determined. Since the magnification of each drawing is greater in the direction vertical to the sheet, an actual angle of elevation or depression of 2° is substantially equivalent to 60° in the drawing.

We claim:

1. A process for the production of a polym-(arylene sulfide) sheet excellent in planarity and smoothness, which comprises:
    melting a composition composed at least principally of a substantially linear, high molecular poly(arylene sulfide) having a melt viscisty of at least 1,000 poises,
    extruding the melt through a slit die;
    cooling and solidifying the extrudate into a sheet;
    preheating the sheet for 3-100 seconds in a temperature range of from a temperature 20° C. lower than the glass transition temperature of the polymer to a temperature 25° C. higher than the glass transition temperature of the polymer; and causing the thus-preheated sheet to pass between a heating roll heated at a temperature in a range of 120°–200° C. and a pinch roll under a pinch pressure of 0.05–10 kg/cm, whereby the sheet is continuously pressed under linear pressure, is subjected to a heat treatment for 3–100 seconds and is crystallized.

2. The process as claimed in claim 1, wherein the crystallized sheet is subjected to an additional heat treatment at an elevated temperature of 200°–280° C. for 0.1–180 minutes.

* * * * *

UNITED STATES PATENT AND TRADEMARK OFFICE
CERTIFICATE OF CORRECTION

PATENT NO. : 4,976,908

DATED : December 11, 1990

INVENTOR(S) : Toshiya MIZUNO et al.

Page 1 of 2

It is certified that error appears in the above-identified patent and that said Letters Patent is hereby corrected as shown below:

Column 3, line 58, delete "(PAS)";

after line 58, insert the heading --(PAS)--.

Column 4, line 40, delete "(Optional components)";

after line 40, insert the heading --(Optional components)--;

line 57, delete "(Linearly-pressurized heat treatment method)";

after line 57, insert the heading --(Linearly-pressurized heat treatment method)--.

Column 6, line 52, delete "(Heat-treated PAS sheet)";

after line 52, insert the heading --(Heat-treated PAS sheet)--.

UNITED STATES PATENT AND TRADEMARK OFFICE
CERTIFICATE OF CORRECTION

PATENT NO. : 4,976,908

DATED : December 11, 1990

INVENTOR(S) : Toshiya MIZUNO et al

It is certified that error appears in the above-identified patent and that said Letters Patent is hereby corrected as shown below:

Col. 16, Claim 1, line 1, change "polym-" to --poly--;--
line 6, change "viscity" to --viscosity--.

Signed and Sealed this

Twenty-second Day of December, 1992

Attest:

DOUGLAS B. COMER

Attesting Officer — Acting Commissioner of Patents and Trademarks